United States Patent
Takahashi

(10) Patent No.: US 7,335,862 B2
(45) Date of Patent: Feb. 26, 2008

(54) RESISTANCE HEATER HAVING A THIN-LINE-SHAPED RESISTOR

(75) Inventor: Morio Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 6 days.

(21) Appl. No.: 10/547,479

(22) PCT Filed: May 28, 2004

(86) PCT No.: PCT/JP2004/007738

§ 371 (c)(1),
(2), (4) Date: Aug. 30, 2005

(87) PCT Pub. No.: WO2004/107813

PCT Pub. Date: Dec. 9, 2004

(65) Prior Publication Data

US 2006/0191900 A1   Aug. 31, 2006

(30) Foreign Application Priority Data

May 30, 2003   (JP) ............................. 2003-153903

(51) Int. Cl.
*H05B 3/10* (2006.01)
*H01L 7/06* (2006.01)
(52) U.S. Cl. ........................ 219/548; 338/10
(58) Field of Classification Search ................ 219/548, 219/549, 550, 551, 468, 553, 409; 338/10, 338/9; H05B 3/10; H01L 7/06
See application file for complete search history.

(56) References Cited

U.S. PATENT DOCUMENTS

| | | | | |
|---|---|---|---|---|
| 5,750,958 A | * | 5/1998 | Okuda et al. ............... 219/267 |
| 6,689,989 B2 | * | 2/2004 | Irwin et al. ................. 219/212 |
| 6,935,727 B2 | * | 8/2005 | DaQuino et al. ............. 347/63 |
| 6,998,148 B1 | * | 2/2006 | You et al. ................. 427/96.1 |
| 7,007,872 B2 | * | 3/2006 | Yadav et al. .................... 241/1 |
| 7,128,398 B2 | * | 10/2006 | DaQuino et al. ............. 347/49 |
| 7,178,747 B2 | * | 2/2007 | Yadav et al. .................. 241/23 |
| 2003/0113730 A1 | * | 6/2003 | DaQuino et al. ............. 435/6 |
| 2006/0028509 A1 | * | 2/2006 | DaQuino et al. ............. 347/49 |

FOREIGN PATENT DOCUMENTS

| | | | |
|---|---|---|---|
| JP | 58-134764 A | 8/1983 |
| JP | 61-219666 A | 9/1986 |
| JP | 3-164270 A | 7/1991 |
| JP | 2003-142533 A | 5/1993 |

(Continued)

*Primary Examiner*—Daniel Robinson
(74) *Attorney, Agent, or Firm*—Sughrue Mion, PLLC

(57) ABSTRACT

A resistor heater includes an anode (10) arranged along one side and a cathode (20) arranged along the other side of a thin-line-shaped resistor (30). The anode (10) is connected to the resistor (30) at connections points (P2, P3) by a plurality of branches (13, 14) arranged at a certain interval along the resistor (30). The cathode (20) is connected to the resistor (30) at connection points (P1, P4) by branches (23, 24) arranged at a certain interval along the resistor (30). The connection points (P1, P4) are located at positions shifted from one another along the resistor (30). A portion (31) of the resistor (30) located between the connections points (P1, P2) and a portion (32) of the resistor (30) located between the connection points (P3, P4) function as effective regions of the resistor (30).

14 Claims, 7 Drawing Sheets

FOREIGN PATENT DOCUMENTS

| | | |
|---|---|---|
| JP | 6-34925 A | 2/1994 |
| JP | 6-34926 A | 2/1994 |
| JP | 68119/1992 | 4/1994 |
| JP | 7-183103 A | 7/1995 |
| JP | 2811209 B2 | 8/1998 |
| JP | 10-332959 A | 12/1998 |
| JP | 11-219774 A | 8/1999 |
| JP | 2000-294738 A | 10/2000 |
| JP | 2001-301219 A | 10/2001 |
| JP | 2001-324732 A | 11/2001 |
| JP | 2002-8901 A | 1/2002 |
| JP | 2003-142508 A | 5/2003 |

\* cited by examiner ( R1=R2=R3=R4=R5 )

RESISTANCE HEATER HAVING A THIN-LINE-SHAPED RESISTOR

TECHNICAL FIELD

The present invention relates to resistive heaters for electrically generating Joule heat and particularly relates to a resistive heater including a wire resistor. The apparent (or superficial) electrical resistance of the resistive heater can be arbitrarily adjusted without changing the shape of the wire resistor.

BACKGROUND ART

"Resistive heaters" for generating Joule heat by applying currents to thin-film resistors are widely used for various applications. Examples of such resistive heaters include micro-sized resistive heaters placed on circuit substrates or semiconductors such as silicon. A large number of attempts have been made to solve problems due to the size of the micro-sized resistive heaters. See, for example, Japanese Unexamined Patent Application Publication Nos. 58-134764, 3-164270, and 61-219666 and Japanese Patent No. 2811209. Techniques relating to these resistive heaters are usually used to heat specific micro-regions (several micrometers square) or relatively large-area regions which are several millimeters to several centimeters square such that semiconductor devices mounted on such regions are heated.

In a case where a square region or a rectangular region which has a small aspect ratio and which is therefore close to a square shape is heated, the shape of a resistive heater placed in the region is not particularly limited. Therefore, a desired object can be readily achieved by allowing the resistive heater to have such a shape that the temperature distribution in the region can be desirably adjusted. For the electrical resistance of resistive heaters, since a large number of holes can be bored in a sheet-shaped resistive heater, the electrical resistance of the heater can be readily adjusted by varying the size and/or number of the holes as disclosed in Japanese Unexamined Patent Application Publication No. 58-134764.

For the resistive heater for heating the square or rectangular region, the temperature distribution obtained by the resistive heater and the electrical resistance of the resistive heater can be adjusted by varying the shape of the resistive heater.

The electrical resistance of the resistive heater is a key factor to determine the necessary performance, for example, the maximum voltage, of an external circuit for driving the resistive heater. If the resistive heater has a large electrical resistance, an extremely high voltage must be applied to the driving circuit. In consideration of the voltage (about 5 to 12 V) of a power supply, connected to a control circuit (usually including semiconductor devices), for controlling the temperature, there is a problem in that these circuits cannot be connected to a common power supply. Thus, it is necessary to adjust the electrical resistance of the resistive heater.

On the other hand, an optical component, for example, "a thermooptic phase shifter", used for optical communication includes a resistive heater (see, for example, Japanese Unexamined Patent Application Publication No. 6-34926). This resistive heater includes a resistor having a width of several micrometers to several tens micrometers and a length of about 2 to 5 mm. The length of the resistor is extremely greater than the width thereof. Therefore, this resistive heater is different from that resistive heater in that the resistor has a narrow line shape (a narrow stripe shape). The thermooptic phase shifter includes an optical waveguide section having a width of about 5 µm and a length of about 2 to 5 mm. In order to selectively heat the optical waveguide section having such a shape using this resistive heater, the resistor must also have a narrow line shape.

Since the resistor has a width of several micrometers, it is difficult to arbitrarily adjust the electrical resistance of the resistor by varying the shape thereof in the same manner as that described above. This is because a micromachining technique is necessary to shape the resistor.

The resistor is allowed to have a thickness of up to several hundreds nanometers because of the reason due to a semiconductor process used to form the thermooptic phase shifter. That is, the thickness of the resistor is limited. The number of materials for forming the optical waveguide section is not very large because such materials must have good machinability, high stability, and high adhesion to a glass material for forming the optical waveguide section.

As described above, in the resistive heater included in the optical component, there is a limitation that the resistor must have a narrow line shape; hence, it is very difficult to prepare a heating element (in particular, a heating element with low electrical resistance) with desired electrical resistance properties by improving the shape of the resistor. Furthermore, it is not easy to adjust the thickness of the resistive heater or change a material for forming the resistive heater as required because of process and material constraints.

There are known techniques relating to the present invention as described below.

Japanese Unexamined Patent Application Publication No. 2001-301219 discloses a thermal print head including a wire resistor. The thermal print head, as specified in claim 1 of this patent document, includes "a linear resistor, a power supply line, a grounding line, and an integrated circuit device, wherein the integrated circuit device includes a plurality of transistors each including respective first electrodes connected to the power supply and respective second electrodes connected to the grounding line and also includes a plurality of pads for connecting the second electrodes to the grounding line and the resistor generates heat when a current is applied to the resistor by bring the transistors into conduction". According to such a configuration, the following advantages can be achieved: "the second electrodes can be connected to the pads with short wires, the wires therefore have low resistance, a difference in wiring resistance between the transistors is small, electricity consumption is low, the life of a battery included in the thermal print head is long if the thermal print head is of a portable type, the thermal print head can be driven with a low-voltage battery because a voltage drop due to the wiring resistance is small, the quality of an image formed by the thermal print head is high because a difference in wiring resistance between the transistors is small and because a difference in temperature between portions of the resistor is small".

In the thermal print head disclosed in Japanese Unexamined Patent Application Publication No. 2001-301219, the resistor and the power supply line are connected to each other with a plurality of spaced wires and the first electrodes of the transistors are connected to the resistor with wires. The first and second electrodes of the transistors correspond to the drains and sources of MOS transistors, respectively. If one of the transistors in the integrated circuit device is turned on, a current flows from the power supply line to the grounding line through the resistor and the transistor. Since the current flows in two wires for connecting the power supply line to the resistor and flows in a portion of the resistor that is sandwiched between the two wires, the resistor portion can be selectively heated.

Japanese Unexamined Patent Application Publication No. 2002-008901 discloses a thin-film resistor, a hybrid IC, and a microwave monolithic integrated circuit (MMIC). In the thin-film resistor, "a first electrode and second electrode connected to thin-film resistor portions have narrow, irregular sections extending in the direction that the first and second electrodes face to each other; sides of the irregular sections of the first and second electrodes are arranged at predetermined intervals; and the thin-film resistor portions are arranged between the sides facing to each other". That is, in the thin-film resistor, an end section of the first electrode is shaped so as to have an interdigital shape so that the irregular electrode sections are formed, an end section of the second electrode is shaped so as to have an interdigital shape so that the irregular electrode sections are formed, and the electrode sections are engaged with each other in such a manner that the interdigital electrode sections of the second electrode are placed in spaces between the interdigital electrode sections of the first electrode. The thin-film resistor portions are separately placed in spaces between the interdigital electrode sections engaged with each other.

According to such a configuration, the following advantages can be achieved: "the thin-film resistor can be shaped so as to have a size close to the width of wires and a region for forming the thin-film resistor can therefore be formed so as to have a desired characteristic impedance".

If the operational stability and reliability of resistive heaters are regarded as most important, tantalum nitride (TaN) is usually used to prepare resistors. Thin-film heaters, made of TaN, for semiconductor circuits have a large electrical resistance because the resistivity of TaN is usually high, 200 to 300 μΩ·cm, under conditions for stably forming layers. If, for example, a TaN layer is processed into fine wires having a thickness of 200 nm a width of 10 μm, and a length of 2 mm, the wires have an electrical resistance of 2 to 3 kΩ. In order to allow a wire resistor, made of TaN, having such an electrical resistance to generate 300 mW of heat, the voltage necessary to energize the wire resistor is very high, 17 to 30 V.

An attempt to prepare a small-sized, precisely controllable heating element including a TaN wire resistor causes a problem, i.e., an increase in the size of a driving power supply. Hence, the attempt is impossible. This can be applied to titanium nitride (TiN), as well as TaN, having a relatively large resistivity.

DISCLOSURE OF INVENTION

It is an object of the present invention to provide a resistive heater including a wire resistor and a thermooptic phase shifter including such a resistive heater. If the wire resistor is made of a material, such as tantalum nitride or titanium nitride, having a relatively large resistivity, the apparent electrical resistance of the resistive heater (the superficial electrical resistance of the resistive heater) is less than the electrical resistance estimated from the material.

It is another object of the present invention to provide a resistive heater of which the apparent electrical resistance can be arbitrarily adjusted and which includes a wire resistor and a thermooptic phase shifter including such a resistive heater.

It is another object of the present invention to provide a resistive heater, including a wire resistor, for producing heat of which the amount can be controlled with a simple electronic circuit and a thermooptic phase shifter including such a resistive heater.

In the thermal print head disclosed in Japanese Unexamined Patent Application Publication No. 2001-301219, a current flows through the resistor portion sandwiched between the two wires for connecting the power supply line to the resistor having a narrow line shape, whereby the resistor portion is selectively allowed to generate heat. However, such a technique is not useful in achieving the following object of the present invention: "if the narrow resistor is made of a material, such as tantalum nitride or titanium nitride, having a relatively large resistivity, the apparent electrical resistance of the resistive heater is less than the electrical resistance estimated from the material". The thermal print head is quite different from a resistive heater according to the present invention.

The thin-film resistor disclosed in Japanese Unexamined Patent Application Publication No. 2002-008901 does not have a wire shape and is therefore different from "a resistive heater including a wire resistor" as specified herein. An object (purpose) thereof is as follows: "when the first and second electrodes have a size significantly greater than the width of lines, the first and second electrodes have a characteristic impedance (for example, 50 Ω) unsuitable for transmission lines; hence, desired operations cannot be performed due to miss-matching". An effect thereof is as follows: "the resistive heater can be formed so as to have a size close to the line width and a region for forming the thin-film resistor can therefore be formed so as to have a desired characteristic impedance". As is clear from the object and effect, the thin-film resistor is quite different from a resistive heater of the present invention.

Further other objects of the present invention will become apparent from descriptions below and the accompanying drawings although the objects are not described above.

(1) A resistive heater of the present invention includes:

a wire resistor;

a first electrode, placed on a side of the resistor, extending along the resistor; and a second electrode, placed on the side opposite to the first electrode, extending along the resistor, wherein the first electrode is connected to a plurality of first nodes placed on the resistor with branches spaced along the resistor, the second electrode is connected to a plurality of second nodes placed on the resistor with branches spaced along the resistor, the second nodes are spaced from the first nodes in the longitudinal direction of the resistor, and the resistor has effective regions each sandwiched between one of the first nodes and one of the second nodes that is adjacent to the first connection.

(2) In the resistive heater of the present invention, the first electrode is placed on a side of the resistor and extends along the resistor and the second electrode is placed on the side opposite to the first electrode and extends along the resistor. The first electrode is connected to the first nodes placed on the resistor with the branches spaced along the resistor and the second electrode is connected to the second nodes placed on the resistor with the branches spaced along the resistor. The second nodes are spaced from the first nodes in the longitudinal direction of the resistor and the resistor has effective regions each sandwiched between one of the first nodes and one of the second nodes that is adjacent to the first connection.

(3) In a preferable example of the resistive heater of the present invention, the first and second nodes are alternately arranged in the longitudinal direction of the resistor.

(4) A thermooptic phase shifter of the present invention includes:

an optical waveguide; and the resistive heater, according to Items (1) to (3) described above, for heating the optical waveguide, wherein the resistor included in the resistive heater extends along the optical waveguide.

(5) The thermooptic phase shifter of the present invention includes the resistive heater, according to Items (1) to (3) described above, for heating the optical waveguide and the resistor of the resistive heater extends along the optical waveguide.

BEST MODE FOR CARRYING OUT THE INVENTION

Figure 1A:
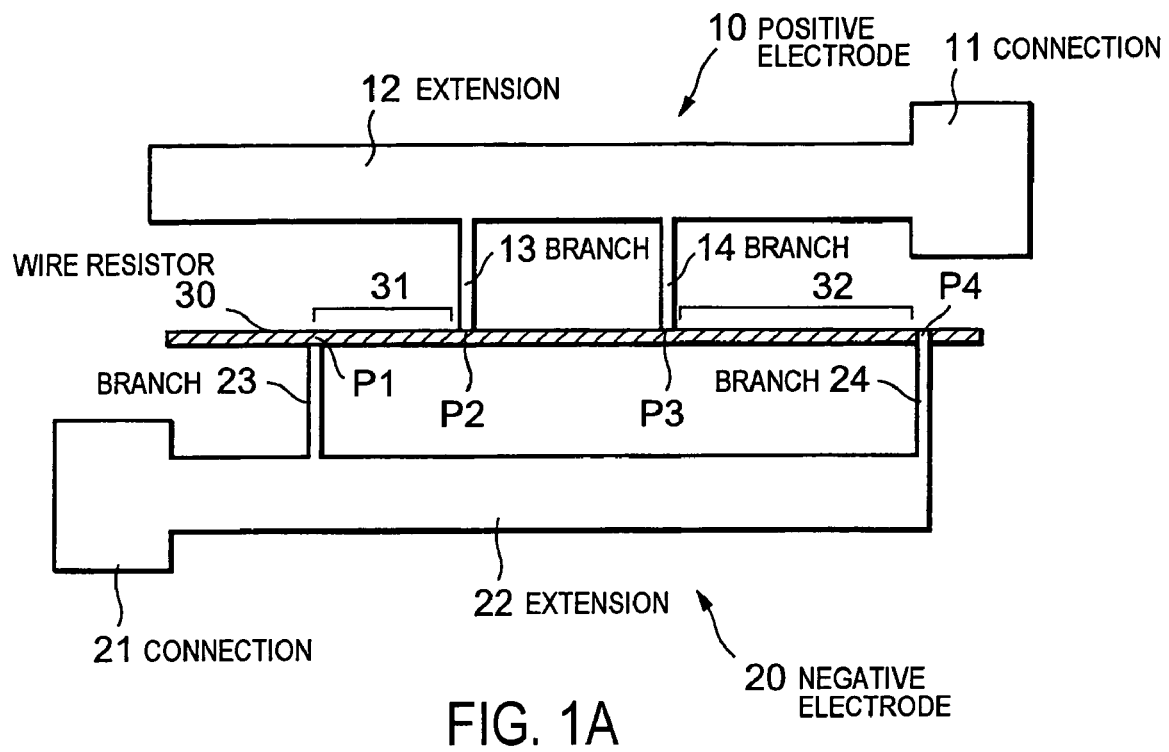
FIG. 1A is a plan view showing a resistive heater according to a first example of the present invention.

A resistive heater according to the present invention will now be described.

According to the present invention, the wire resistor is divided into a plurality of effective regions and non-effective regions other than the effective regions with the first and second nodes. If the resistor is made of a material, such as tantalum nitride or titanium nitride, having a relatively large resistivity, the apparent electrical resistance (the superficial electrical resistance of the resistive heater) is less than the electrical resistance of the material because the effective regions are connected to the first and second electrodes in parallel. Therefore, the amount of heat generated by the resistive heater can be controlled with a simple electronic circuit.

The number, position, and/or length of the effective regions can be varied by changing the number and/or position of the branches of the first or second electrode. Therefore, the apparent electrical resistance of the resistive heater (the superficial electrical resistance of the resistive heater) can be readily adjusted to any value.

In a preferable example of the resistive heater according to the present invention, the first electrode and the second electrode, i.e., a positive electrode and a negative electrode, are alternately arranged in the longitudinal direction of the resistor; hence, heat is generated from substantially the whole of the resistor. Therefore, there is an advantage in that the temperature of the resistive heater is uniform in the longitudinal direction thereof. Furthermore, since the temperature of the resistive heater is uniform in the longitudinal direction, the resistor can be prevented from being deteriorated. Therefore, there is an advantage in that the resistive heater has high long-term reliability.

In another preferable example of the resistive heater according to the present invention, the first and second nodes are arranged such that the effective regions extending in the longitudinal direction of the resistor have the same length. In this example, the effective regions generate the same amount of heat (calorific power); hence, the temperature of the resistive heater is uniform in the longitudinal direction. Therefore, there is an advantage in that a stress applied to the resistor can be greatly reduced. Furthermore, the effective regions sandwiched between the first and second electrodes (for example, a positive electrode and a negative electrode) have the same electrical resistance; hence, there is an advantage in that the resistive heater can be readily designed, controlled, and operated.

In another preferable example of the resistive heater according to the present invention, any two of the first and second nodes are each placed at one of both ends of the resistor. In this example, since the whole of the resistor can be effectively used, the apparent electrical resistance R' of the resistive heater is determined depending only on the number n of the effective regions of the resistive heater. This means that the apparent electrical resistance R' can be designed using only the number n of the effective regions; hence, there is an advantage in that the resistive heater can be readily designed.

In another preferable example of the resistive heater according to the present invention, the resistor is made of a material principally containing tantalum nitride or titanium nitride. In this example, the material for forming the resistor has high reliability and the tantalum nitride and titanium nitride have relatively high resistivity; hence, there is an advantage in that advantages of the present invention can be maximized.

In another preferable example of the resistive heater according to the present invention, the first and second electrodes are made of a material containing at least two selected from the group consisting of gold, platinum, chromium, titanium, copper, aluminum, titanium nitride, and tantalum nitride. In this example, the first and second electrodes have an electrical resistance sufficiently less than that of the resistor; hence, there is an advantage in that the resistor can efficiently generate heat.

Thus, the same advantage as that of the resistor of the present invention can be achieved. Furthermore, there is an advantage in that it is preferable to efficiently use heat generated by the resistive heater of the present invention.

Examples of the resistor according to the present invention will now be described in detail with reference to the accompanying drawings.

FIRST EXAMPLE

Figure 1B:
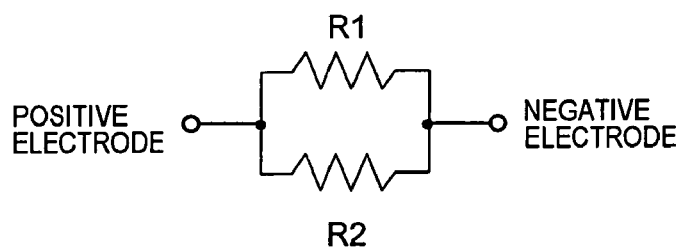
FIG. 1B is a diagram showing an equivalent circuit of the resistive heater shown in FIG. 1A.

FIG. 1A is a plan view showing a configuration of a resistive heater according to a first example of the present invention and FIG. 1B is a diagram showing an equivalent circuit of the resistive heater.

With reference to FIG. 1A, the resistive heater of the first example is placed on an insulating substrate (not shown) and includes a wire resistor 30 having a predetermined length; a positive electrode 10, placed on a side (the upper side in FIG. 1A) of the resistor 30, extending along the resistor 30; and a negative electrode 20, placed on the side (the lower side in FIG. 1A) opposite to the positive electrode 10, extending along the resistor 30.

The resistor 30 extends straight on the substrate and has a uniform width of, for example, 10 μm. The resistor 30 has a length of, for example, 2 mm and a thickness of, for example, 200 nm. The resistor 30 is made of TaN or TiN.

The positive electrode 10 extends along the resistor 30 and they are spaced from each other. The negative electrode 20 extends along the resistor 30 and they are spaced from each other. The positive electrode 10 and the negative electrode 20 are parallel to the resistor 30. The positive electrode 10 and the negative electrode 20 each include a conductive body having a resistivity sufficiently less than that of the resistor 30. The conductive body has a triple layer structure consisting of an aluminum (Al) layer, a titanium (Ti) layer, and a gold (Au) layer.

The positive electrode 10 includes a connection 11, an extension 12, and two branches 13 and 14. The connection 11 is connected to an external circuit, that is, the connection 11 is used as a bonding pad. The extension 12 has a stripe shape and extends from the connection 11 in parallel to the resistor 30. The branches 13 and 14 are arranged between the extension 12 and the resistor 30. The branches 13 and 14 have a stripe shape, are narrower than the extension 12, meet the resistor 30 and the extension 12 at right angles, and are spaced along the resistor 30. The branch 13 is connected to a node P2 placed on the resistor 30. The branch 14 is connected to a node P3 placed on the resistor 30. The positive electrode 10 has an electrical resistance sufficiently less than that of the resistor 30.

The negative electrode 20 as well as the positive electrode 10 includes a connection 21, an extension 22, and two branches 23 and 24. The connection 21 is connected to an external circuit, that is, the connection 21 is used as a bonding pad. The extension 22 has a stripe shape and extends from the connection 21 in parallel to the resistor 30. The branches 23 and 24 are arranged between the extension 22 and the resistor 30. The branches 23 and 24 have a stripe shape, are narrower than the extension 22, meet the resistor 30 and the extension 22 at right angles, and are spaced along the resistor 30. The branch 23 is connected to a node P1 placed on the resistor 30. The branch 24 is connected to a node P4 placed on the resistor 30. The negative electrode 20 also has an electrical resistance sufficiently less than that of the resistor 30.

The node P2 connected to the branch 13 of the positive electrode 10 is spaced from the node P3 connected to the branch 14 of the positive electrode 10 in the longitudinal direction of the resistor 30. The node P1 connected to the branch 23 of the negative electrode 20 is spaced from the node P4 connected to the branch 24 of the negative electrode 20 in the longitudinal direction of the resistor 30. The node P1 connected to the negative electrode 20 is spaced from the nodes P2 and P3 placed on the positive electrode 10 in the longitudinal direction of the resistor 30. The node P4 placed on the negative electrode 20 is spaced from the nodes P2 and P3 placed on the positive electrode 10 in the longitudinal direction of the resistor 30. That is, the nodes P1 to P4 are located at different positions.

In the resistive heater according to the first example of the present invention, since the nodes P1 to P4 are arranged as described above, the resistor 30 has an effective region 31 sandwiched between the node P2 placed on the positive electrode 10 and the node P1 placed on the negative electrode 20 and an effective region 32 sandwiched between the node P3 placed on the positive electrode 10 and the node P4 placed on the negative electrode 20 (see FIGS. 1A and 1B). Regions other than the effective regions 31 and 32 do not function as "resistive regions" and are therefore referred to as non-effective regions.

If a predetermined voltage is applied to the positive electrode 10 from a power supply and the negative electrode 20 is grounded, currents flow from the positive electrode 10 to the negative electrode 20. In this situation, a current flows from the branch 13 of the positive electrode 10 to the branch 23 of the negative electrode 20 through the effective region 31 of the resistor 30 and a current flows from the branch 14 of the positive electrode 10 to the branch 24 of the negative electrode 20 through the effective region 32 of the resistor 30. No current flows between the branches 13 and 14 of the positive electrode 10. This is because the branches 13 and 14 have the same potential. As a matter of course, no currents flow in both end regions of the resistor 30, that is, one end region located on the left side of the branch 23 of the negative electrode 20 and the other end region located on the right side of the branch 24 of the negative electrode 20.

If the electrical resistances of the positive and negative electrodes 10 and 20 are negligible, an equivalent circuit of the resistor 30 is as shown in FIG. 1B, wherein R1 represents the electrical resistance of the effective region 31 and R2 represents the electrical resistance of the effective region 32. The apparent electrical resistance of the resistive heater (the superficial electrical resistance of the resistive heater) according to the first example of the present invention is equal to the electrical resistance of a circuit including two resistors, connected to each other in parallel, having an electrical resistance equal to R1 or R2. Therefore, the apparent electrical resistance of the resistive heater is greatly less than the electrical resistance estimated from the resistivity of the resistor 30.

As described above, although the resistor 30 is made of a material, such as TaN or TiN, having a relatively large resistivity, the resistive heater (see FIGS. 1A and 1B) according to the first example of the present invention has an apparent electrical resistance less than that estimated from the material. Therefore, the amount of heat generated by the resistive heater can be controlled with a simple electronic circuit.

The number, position, and/or length of the effective regions of the resistor 30 can be varied by changing the number and/or position of the branches of the positive or negative electrode 10 or 20. Therefore, the apparent electrical resistance of the resistive heater can be adjusted to any value.

Thus, a control circuit, a driving circuit, and other circuits can be connected to a common power supply; hence, a small-sized, user-friendly heating element can be achieved.

Figure 7A:
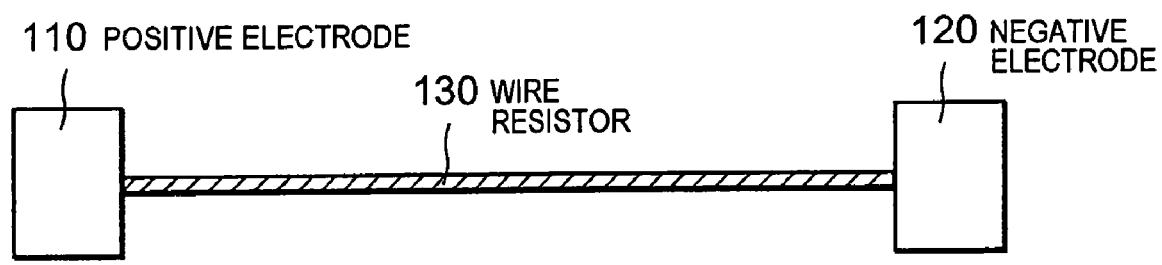
FIG. 7A is a plan view showing a known resistive heater.
Figure 7B:
FIG. 7B is a diagram showing an equivalent circuit of the known resistive heater shown in FIG. 7A.

FIG. 7A is a plan view showing a configuration of a known resistive heater, which is a comparative example, and FIG. 7B is a diagram showing an equivalent circuit of the known resistive heater. The known resistive heater shown in FIG. 7A includes a wire resistor 130, a positive electrode 110 connected to one end of the resistor 130, a negative electrode 120 connected to the other end thereof. The equivalent circuit thereof is as shown in FIG. 7B and the apparent electrical resistance of this resistive heater is equal to the electrical resistance R of the resistor 130. Therefore, once the resistor 130 is formed, the apparent electrical resistance of this resistive heater cannot be adjusted.

The configuration of the resistive heater according to the first example of the present invention can be generally described as below.

The following equation (1) holds:

$$(1/R')=(1/R)\times\{(1/m_1)+(1/m_2)+\ldots+(1/m_n)\} \tag{1}$$

wherein R' represents the apparent electrical resistance of the resistive heater observed from an external driving circuit, $m_1, m_2, \ldots,$ and $m_n$ represent the percentages of effective regions in the resistive heater and are less than 1, and n represents the number of the effective regions and is not equal to 0.

Since $m_1$ to $m_n$ are less than 1, R' is less than R. Accordingly, the resistive heater has an electrical resistance less than that of the known resistive heater shown in FIGS. 7A and 7B.

SECOND EXAMPLE

Figure 2A:
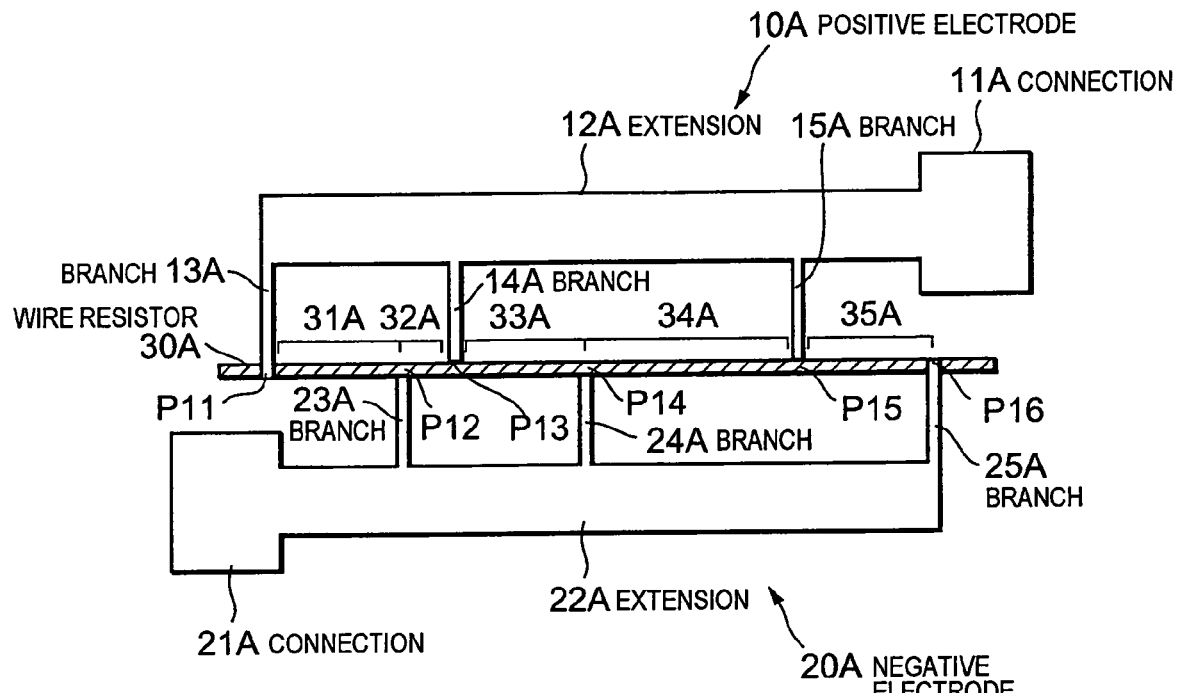
FIG. 2A is a plan view showing a resistive heater according to a second example of the present invention.
Figure 2B:
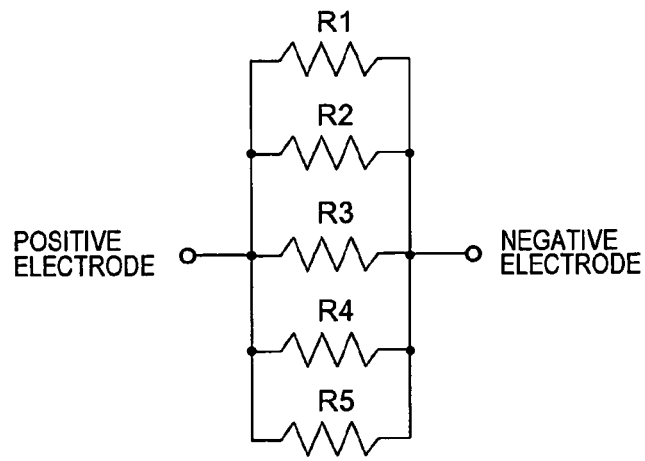
FIG. 2B is a diagram showing an equivalent circuit of the resistive heater shown in FIG. 2A.

FIG. 2A is a plan view showing a configuration of a resistive heater according to a second example of the present invention and FIG. 2B is a diagram showing an equivalent circuit of the resistive heater.

With reference to FIG. 2A, the resistive heater of the second example is placed on an insulating substrate (not shown) and includes a wire resistor 30A having a predetermined length; a positive electrode 10A, placed on a side (the upper side in FIG. 2A) of the resistor 30A, extending along the resistor 30A; and a negative electrode 20A, placed on the side (the lower side in FIG. 2A) opposite to the positive electrode 10A, extending along the resistor 30A.

Other components of the resistor 30A are the same as those of the resistor 30 of the first example and the description of the resistor 30A is therefore omitted.

The positive electrode 10A extends along the resistor 30A and they are spaced from each other. The negative electrode 20A extends along the resistor 30A and they are spaced from each other. The positive electrode 10A and the negative electrode 20A are parallel to the resistor 30A. The positive electrode 10 and the negative electrode 20 each include a conductive body having a resistivity sufficiently less than that of the resistor 30A.

The positive electrode 10A includes a connection 11A, an extension 12A, and three branches 13A, 14A, and 15A. The connection 11A is connected to an external circuit. The extension 12A has a stripe shape and extends from the connection 11A in parallel to the resistor 30A. The branches 13A, 14A, and 15A are arranged between the extension 12A and the resistor 30A. The branches 13A, 14A, and 15A have a stripe shape, are narrower than the extension 12A, meet the resistor 30A and the extension 12A at right angles, and are spaced along the resistor 30.

The branch 13A is connected to a node P11 placed on the resistor 30A. The branch 14A is connected to a node P13 placed on the resistor 30A. The branch 15A is connected to a node P15 placed on the resistor 30A. The positive electrode 10A has an electrical resistance sufficiently less than that of the resistor 30A.

The negative electrode 20A as well as the positive electrode 10A includes a connection 21A, an extension 22A, and three branches 23A, 24A, and 25A. The connection 21A is connected to an external circuit. The extension 22A has a stripe shape and extends from the connection 21A in parallel to the resistor 30A. The branches 23A, 24A, and 25A are arranged between the extension 22A and the resistor 30A. The branches 23A, 24A, and 25A have a stripe shape, are narrower than the extension 22A, meet the resistor 30A and the extension 22A at right angles, and are spaced along the resistor 30A.

The branch 23A is connected to a node P12 placed on the resistor 30A. The branch 24A is connected to a node P14 placed on the resistor 30A. The branch 25A is connected to a node P16 placed on the resistor 30A. The negative electrode 20A also has an electrical resistance sufficiently less than that of the resistor 30A.

The nodes P11, P13, and P15 connected to the branches 13A, 14A, and 15A, respectively, on the positive electrode 10A are spaced from each other in the longitudinal direction of the resistor 30A. The nodes P12, P14, and P16 connected to the branches 23A, 24A, and 25A, respectively, on the positive electrode 10A are spaced from each other in the longitudinal direction of the resistor 30A. The node P12 on the negative electrode 20A is spaced from the nodes P11, P13, and P15 on the positive electrode 10A in the longitudinal direction of the resistor 30A. The node P14 on the negative electrode 20A is spaced from the nodes P11, P13, and P15 on the positive electrode 10A in the longitudinal direction of the resistor 30A. The node P16 on the negative electrode 20A is spaced from the nodes P11, P13, and P15 on the positive electrode 10A in the longitudinal direction of the resistor 30A. That is, the nodes P11 to P16 are located at different positions.

In the resistive heater according to the second example of the present invention, since the nodes P11 to P16 are arranged as described above, the resistor 30A has effective regions 31A, 32A, 33A, 34A, and 35A (see FIGS. 2A and 2B). Regions other than the five effective regions 31A, 32A, 33A, 34A, and 35A do not function as "resistive regions" and are therefore referred to as non-effective regions. The region 31A is a portion of the resistor 30A that is sandwiched between the node P11 on the positive electrode 10A and the node P12 on the negative electrode 20A. The region 32A is a portion of the resistor 30A that is sandwiched between the node P13 on the positive electrode 10A and the node P12 on the negative electrode 20A. The region 33A is a portion of the resistor 30A that is sandwiched between the node P13 on the positive electrode 10A and the node P 14 on the negative electrode 20A. The region 34A is a portion of the resistor 30A that is sandwiched between the node P15 on the positive electrode 10A and the node P 14 on the negative electrode 20A. The region 35A is a portion of the resistor 30A that is sandwiched between the node P15 on the positive electrode 10A and the node P 16 on the negative electrode 20A.

If a predetermined voltage is applied to the positive electrode 10A from a power supply and the negative electrode 20A is grounded, currents flow from the positive electrode 10A to the negative electrode 20A. In this situation, a current flows from the branch 13A of the positive electrode 10A to the branch 23A of the negative electrode 20A through the effective region 31A of the resistor 30A, a current flows from the branch 14A of the positive electrode 10A to the branch 23A of the negative electrode 20A through the effective region 32A of the resistor 30A, a current flows from the branch 14A of the positive electrode 10A to the branch 24A of the negative electrode 20A through the effective region 33A of the resistor 30A, a current flows from the branch 15A of the positive electrode 10A to the branch 24A of the negative electrode 20A through the effective region 34A of the resistor 30A, and a current flows from the branch 15A of the positive electrode 10A to the branch 25A of the negative electrode 20A through the effective region 35A of the resistor 30A. No currents flow in a portion located outside the branch 13A (the node P 11) of the positive electrode 10A and a portion located outside the branch 25A (the node P 16) of the negative electrode 20A.

If the electrical resistances of the positive and negative electrodes 10A and 20A are negligible, an equivalent circuit of the resistor 30A is as shown in FIG. 2B, wherein R1, R2, R3, R4, and R5 represent the electrical resistance of the effective regions 31A, 32A, 33A, 34A, and 35A, respectively. The apparent electrical resistance R' of the resistive heater according to the second example of =the present invention is equal to the electrical resistance of a circuit including five resistors, connected to each other in parallel, having an electrical resistance equal to R1, R2, R3, R4, or R5. Therefore, the apparent electrical resistance R' of the resistive heater is greatly less than the electrical resistance estimated from the resistivity of the resistor 30A.

The resistive heater of the second example has the same advantages as those of the resistive heater of the first example. Furthermore, the apparent electrical resistance R' of the resistive heater of the second example is less than that of the resistive heater of the first example.

In the resistive heater of the second example, since the nodes P11, P13, and P15 of the positive electrode 10A and the nodes P12, P14, and P16 of the negative electrode 20A are alternately arranged in the longitudinal direction of the resistor 30A, each region of the resistor 30A that is sandwiched between the nodes adjacent to each other effectively functions. Therefore, the resistor 30A has no non-effective regions except for both end regions thereof. This means that available regions of the resistor 30A can be fully used. Therefore, almost all regions of the resistor 30A are allowed to generate heat; hence, the temperature thereof is uniform. Furthermore, since the resistive heater of the second example generates heat from the effective regions having a larger area as compared to the resistive heater of the first example, a load applied to the resistor 30A is distributed; hence, there is an advantage in that this resistive heater can be prevented from being deteriorated.

THIRD EXAMPLE

Figure 3A:
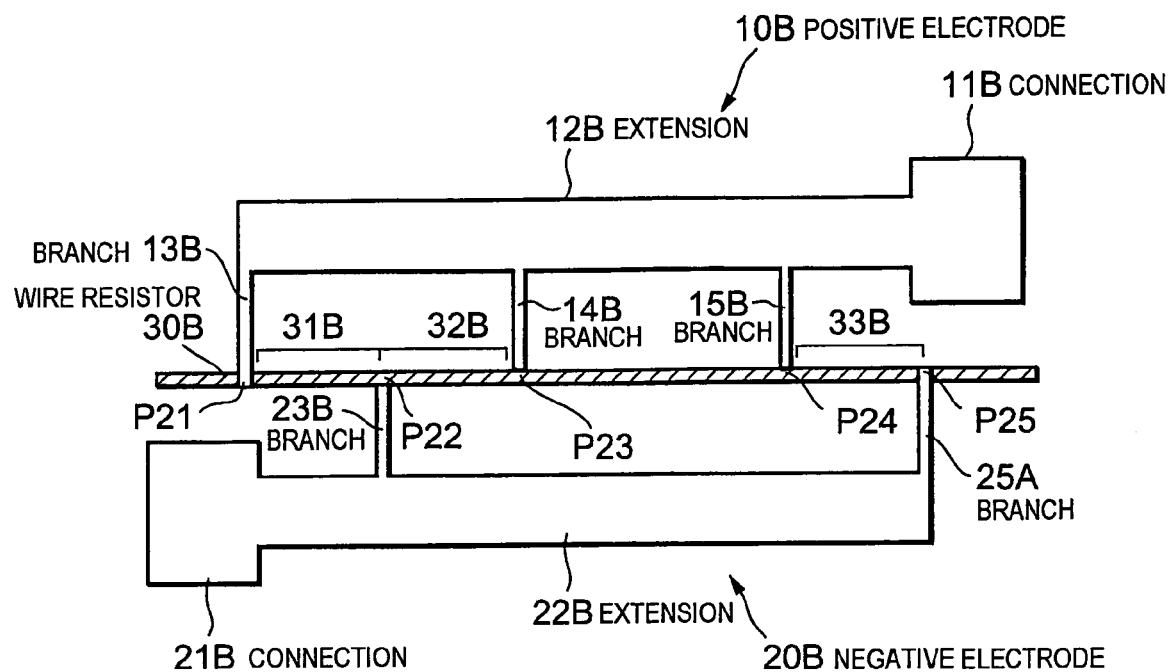
FIG. 3A is a plan view showing a resistive heater according to a third example of the present invention.
Figure 3B:
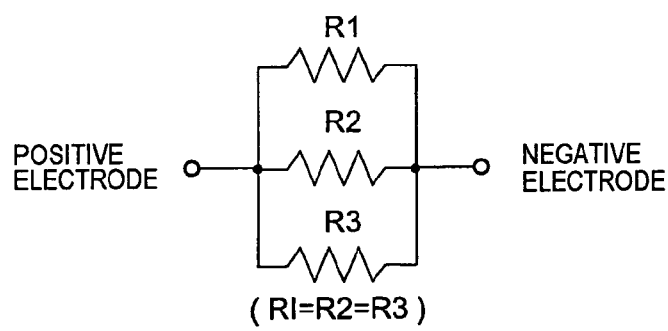
FIG. 3B is a diagram showing an equivalent circuit of the resistive heater shown in FIG. 3A.

FIG. 3A is a plan view showing a configuration of a resistive heater according to a third example of the present invention and FIG. 3B is a diagram showing an equivalent circuit of the resistive heater.

With reference to FIG. 3A, the resistive heater of the third example as well as the resistive heater of the first example is placed on an insulating substrate (not shown) and includes a wire resistor 30B having a predetermined length; a positive electrode 10B, placed on a side (the upper side in FIG. 3A) of the resistor 30B, extending along the resistor 30B; and a negative electrode 20B, placed on the side (the lower side in FIG. 3A) opposite to the positive electrode 10B, extending along the resistor 30B.

Other components of the resistor 30B are the same as those of the resistor 30 of the first example and the description of the resistor 30B is therefore omitted.

The positive electrode 10B has the same configuration as that of the positive electrode 10 of the first example except that the positive electrode 10B includes three branches 13B, 14B, and 15B. Reference numeral 11B represents a connection and reference numeral 12B represents an extension.

The branch 13B of the positive electrode 10B is connected to a node P21 placed on the resistor 30B. The branch 14B is connected to a node P23 placed on the resistor 30B. The branch 15B is connected to a node P24 placed on the resistor 30B.

The negative electrode 20B has the same configuration as that of the negative electrode 20 of the first example. Reference numeral 21B represents a connection, reference numeral 22B represents an extension, and reference numerals 23B and 24B represent branches.

The branch 23B of the negative electrode 20B is connected to a node P22 placed on the resistor 30B. The branch 24B is connected to a node P25 placed on the resistor 30B.

In this example, an effective region 31B is present between the nodes P21 and P22 of the resistor 30B, an effective region 32B is present between the nodes P22 and P23, and an effective region 33B is present between the nodes P24 and P25. The nodes P21 to P25 are arranged such that the three effective regions 31B, 32B, and 33B have the same length. Therefore, the effective regions 31B, 32B, and 33B have the same electrical resistance.

If the electrical resistances of the positive and negative electrodes 10B and 20B are negligible, an equivalent circuit of the resistor 30B is as shown in FIG. 3B, wherein R1, R2, and R3 (R1=R2=R3) represent the electrical resistance of the effective regions 31A, 32A, and 33A, respectively. The apparent electrical resistance R' of the resistive heater according to the third example of the present invention is equal to the electrical resistance of a circuit including three resistors, connected to each other in parallel, having an electrical resistance equal to R1, R2, or R3. Therefore, the apparent electrical resistance R' of the resistive heater is greatly less than the electrical resistance estimated from the resistivity of the resistor 30B.

As described above, the resistive heater of the third example has the same advantage as that of the resistive heater of the first example.

The following equation (2) holds:

$$1/R' = (1/R) \times (n/m) \qquad (2)$$

wherein R' represents the apparent electrical resistance of the resistive heater observed from an external driving circuit, n represents the number of the effective regions of the resistive heater and is not equal to 0, and m represents the percentage of the effective regions in the resistive heater and is less than 1.

Therefore, there is an advantage in that the apparent electrical resistance R' of the resistive heater can be readily determined using the number n of the effective regions of the resistive heater and the percentage m of the effective regions in the resistive heater.

FOURTH EXAMPLE

Figure 4A:
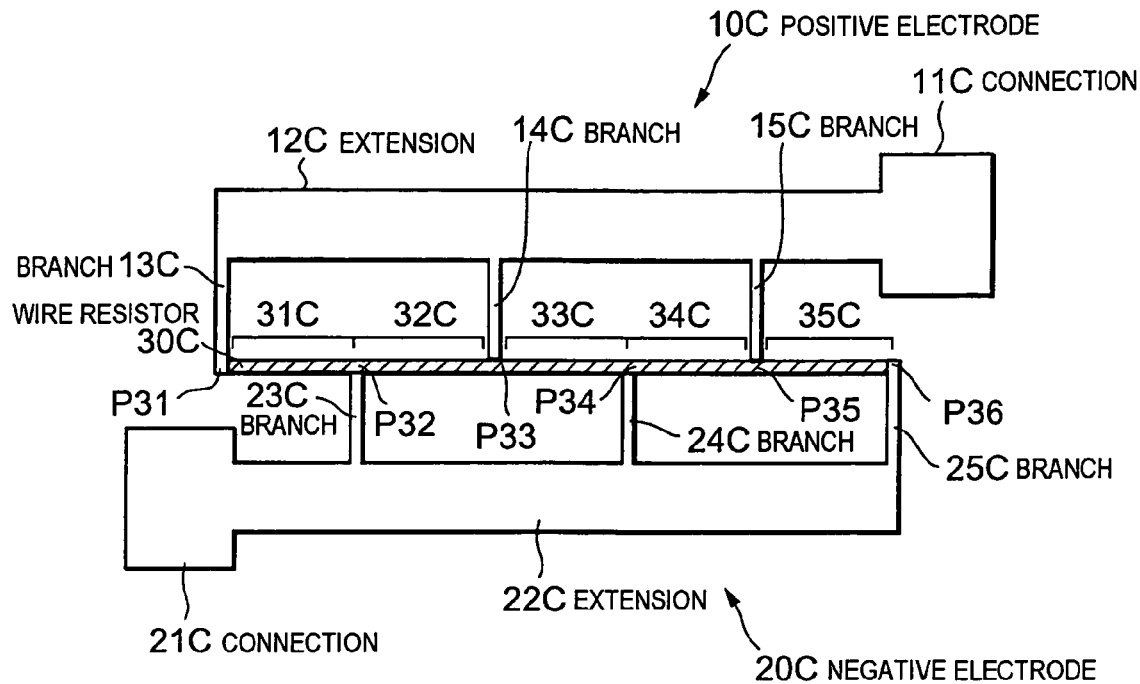
FIG. 4A is a plan view showing a resistive heater according to a fourth example of the present invention.
Figure 4B:
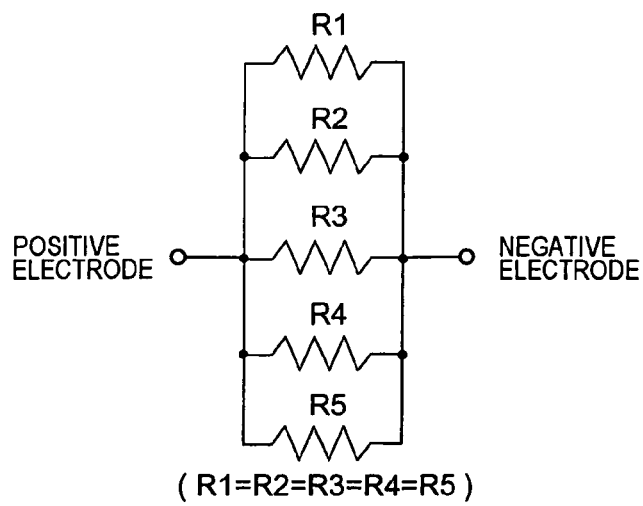
FIG. 4B is a diagram showing an equivalent circuit of the resistive heater shown in FIG. 4A.

FIG. 4A is a plan view showing a configuration of a resistive heater according to a fourth example of the present invention and FIG. 4B is a diagram showing an equivalent circuit of the resistive heater.

With reference to FIG. 4A, the resistive heater of the fourth example, as well as that of the first example, is placed on an insulating substrate (not shown) and includes a wire resistor 30C having a predetermined length; a positive electrode 10C, placed on a side (the upper side in FIG. 4A) of the resistor 30C, extending along the resistor 30C; and a negative electrode 20C, placed on the side (the lower side in FIG. 4A) opposite to the positive electrode 10C, extending along the resistor 30C.

The resistor 30C has no region extending out of a node P31 nor P36. In other words, the resistor 30C has substantially the same configuration as that of the resistor 30A, shown in FIGS. 2A and 2B, according to the second example except that the nodes P31 and P36 are each placed at one of both ends of the resistor 30C; hence, the description of the resistor 30C is omitted.

The positive electrode 10C has the same configuration as that of the positive electrode 10A of the second example except that the positions of three branches 13C, 14C, and 15C included in the positive electrode 10C are different from those of the branches of the positive electrode 10A of the second example. Reference numeral 11C represents a connection and reference numeral 12C represents an extension.

The branch 13C of the positive electrode 10C is connected to the node P31 of the resistor 30C. The branch 14C is connected to a node P33 placed on the resistor 30C. The branch 15C is connected to a node P35 placed on the resistor 30C.

The negative electrode 20C has the same configuration as that of the negative electrode 20A of the second example except that the positions of three branches 23C, 24C, and 25C included in the negative electrode 20C are different from those of the branches of the negative electrode 20A of the second example. Reference numeral 21C represents a connection and reference numeral 22C represents an extension.

The branch 23C of the negative electrode 20C is connected to a node P32 placed on the resistor 30C. The branch 24C is connected to a node P34 placed on the resistor 30C. The branch 25C is connected to the node P36 of the resistor 30C.

In this example, an effective region 31C is present between the nodes P31 and P32 of the resistor 30C, an effective region 32C is present between the nodes P32 and P33, an effective region 33C is present between the nodes P33 and P34, an effective region 34C is present between the nodes P34 and P35, and an effective region 35C is present between the nodes P35 and P36. The nodes P31 to P36 are arranged such that the five effective regions 31C, 32C, 33C, 34C, and 35C have the same length. Therefore, the effective regions 31C, 32C, 33C, 34C, and 35C have the same electrical resistance.

If the electrical resistances of the positive and negative electrodes 10C and 20C are negligible, an equivalent circuit of the resistor 30C is as shown in FIG. 4B, wherein R1, R2, R3, R4, and R5 (R1=R2=R3=R4=R5) represent the electrical resistance of the effective regions 31A, 32A, 33A, 34A, and 35A, respectively. The apparent electrical resistance R' of the resistive heater according to the fourth example of the present invention is equal to the electrical resistance of a circuit including five resistors, connected to each other in parallel, having an electrical resistance equal to R1, R2, R3, R4, or R5. Therefore, the apparent electrical resistance R' of the resistive heater is greatly less than the electrical resistance estimated from the resistivity of the resistor 30C.

As described above, the resistive heater of the fourth example has the same advantage as that of the resistive heater of the first example.

Above equation (2) holds for the apparent electrical resistance R' of the resistive heater observed from an external driving circuit, the number n (n≠1) of the effective regions of the resistive heater, and the percentage m (m<1) of each effective region in the wire resistor. In the resistive heater of the fourth example, since the branch 13C of the positive electrode 10C and the branch 25C of the negative electrode 20C are each connected to one of both ends of the resistor 30C, the whole of the resistor 30C can be effectively used. Therefore, the following equation holds:

$$m \times n = 1 \quad (3)$$

The following equation (4) can be obtained by substituting equation (3) into equation (2):

$$R' = R/(n^2) \quad (4)$$

That is, the apparent electrical resistance R' of the resistive heater can be determined using only the number n of the effective regions of the resistive heater. This means that the apparent electrical resistance R' can be designed based only on the number n of the effective regions; hence, there is an advantage in that the resistive heater of the fourth example can be readily designed in addition to the advantages described in the third example.

A method for manufacturing the resistive heater (see FIGS. 4A and 4B) according to the fourth example of the present invention will now be described.

FIGS. 5A to 5E are sectional views showing principal parts of the resistive heater in the order of manufacturing steps. The resistor 30C is made of a material, such as TiN, having a resistivity of 200 μΩ·cm. TiN as well as TaN is very chemically stable as disclosed in Japanese Unexamined Patent Application Publication Nos. 2000-294738 and 6-34925; hence, TiN is useful in achieving high long-term reliability.

Figure 5A:
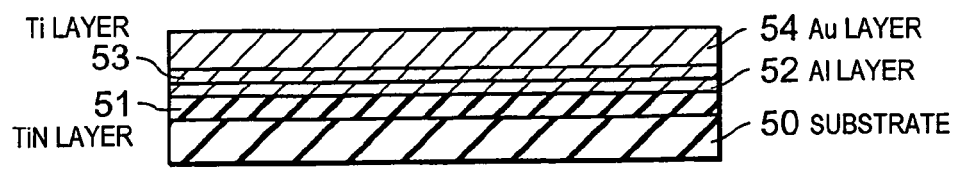
FIGS. 5A to 5E are sectional views showing principal parts of the resistive heater of the fourth example in the order of manufacturing steps.

First of all, as shown in FIG. 5A, the following layers are formed on an insulating substrate 50 in this order by a sputtering process: a TiN layer 51 having a thickness of, for example, 200 nm; an aluminum (Al) layer 52 having a thickness of, for example, 200 nm; a titanium (Ti) layer 53 having a thickness of, for example, 100 nm; and a gold (Au) layer 54 having a thickness of, for example, 500 nm. Examples of the insulating substrate 50 include a glass substrate, ceramic substrate, and silicon substrate having a silica layer thereon. The following process can be used instead of the sputtering process: a reactive sputtering process, an electron beam vapor deposition process, a resistance-heating vapor deposition process, or another process. The resistor 30C is prepared by processing the TiN layer 51 and may be made of TaN or another material. The aluminum layer 52, the titanium layer 53, and the gold layer 54 form a conductive layer having a triple layer structure. The conductive layer is patterned into the positive electrode 10C and the negative electrode 20C. The conductive layer may have a triple layer structure consisting of a copper (Cu) layer, a chromium (Cr) layer, and a platinum (Pt) layer without including the aluminum layer 52 and the titanium layer 53 and another type of conductive layer may be used.

Figure 5B:
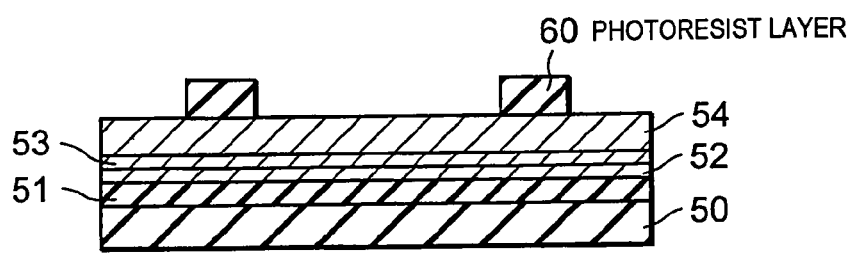

As shown in FIG. 5B, a photoresist layer 60 is formed on the Au layer 54 and then patterned by a photolithographic process. The resulting photoresist layer 60 is used as a mask when the Al layer 52, the Ti layer 53, and the Au layer 54 are etched into the positive electrode 10C and the negative electrode 20C.

Figure 5C:
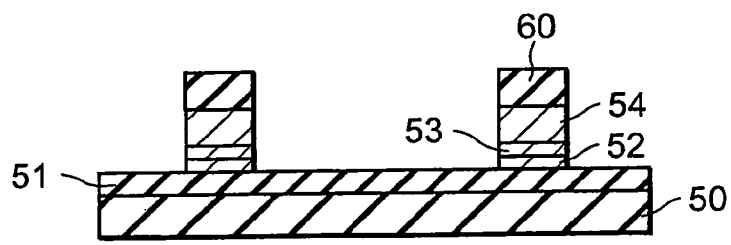

The Al layer 52, the Ti layer 53, and the Au layer 54 are etched using the photoresist layer 60 as a mask, whereby the positive electrode 10C and negative electrode 20C each including portions of these three layers are formed as shown in FIG. 5C. In this etching step, a wet etching process or a dry etching process such as a milling process or a reactive ion etching process may be used.

Figure 5D:
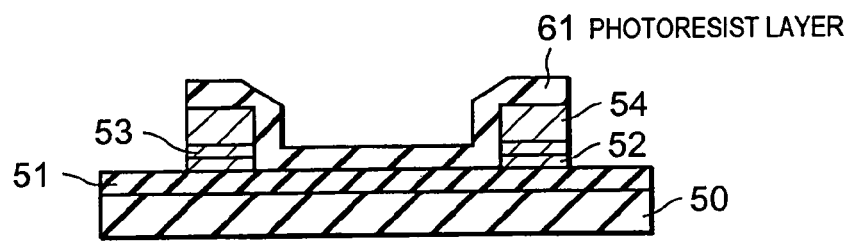

The photoresist layer 60 is removed and the surfaces of the positive electrode 10C, the negative electrode 20C, and the TiN layer 51 are then cleaned. As shown in FIG. 5D, another photoresist layer 61 is formed on the TiN layer 51 and then patterned by a photolithographic process. This photoresist layer 61 is used as a mask when the TiN layer 51 is etched so as to have a wire shape identical to the shape of the resistor 30C.

Figure 5E:
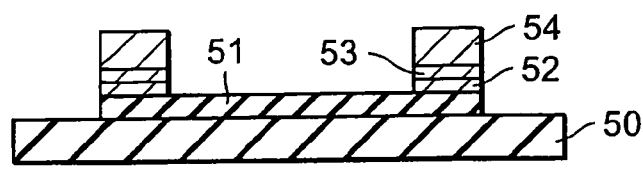

The TiN layer 51 is etched using the photoresist layer 61 as a mask, whereby the resistor 30C made of TiN layer 51 as shown in FIG. 5E. In this etching step, a wet etching process or a dry etching process such as a milling process or a reactive ion etching process may be used. According to this procedure, the resistive heater, shown in FIGS. 4A and 4B, according to the fourth example is completed.

The resistor 30C made of TiN layer 51 has a width of 10 µm, a length of 2 mm, and a thickness of 200 nm. If the known resistive heater shown in FIGS. 7A and 7B includes the resistor 30C, this known resistive heater has an electrical resistance of 2 kΩ because the resistivity of TiN is 200 µΩ·cm. In order to allow this known resistive heater to generate 300 mW of heat, a power supply with a voltage of 17 V or more must be used. However, the voltage of a power supply for electronic circuits is about 3 to 12 V; hence, it is useless to connect this known resistive heater and an electronic circuit to a common power supply. Therefore, a power supply devoted to this known resistive heater must be designed.

On the other hand, the resistive heater, shown in FIGS. 4A and 4B, according to the fourth example includes the resistor 30C made of TiN layer 51 and the number of the effective regions of the resistive heater is equal to five, that is, n=5. Therefore, the apparent electrical resistance R' can be determined using equation (4) as follows:

$$R' = 2 \text{ k}\Omega/(5^2) = 80 \text{ }\Omega$$

In order to allow the resistive heater to generate 300 mW of heat, the voltage of a necessary power supply is 4.9 V. Therefore, it is useful to commonly connect the resistive heater and an electronic circuit to this power supply.

If the number of effective regions of a resistive heater is equal to eight, that is, n=8, the apparent electrical resistance R' thereof can be determined as follows:

$$R' = 2 \text{ k}\Omega/(8^2) = 31.25 \text{ }\Omega$$

In order to allow this resistive heater to generate 300 mW of heat, the voltage of a necessary power supply is about 3.1 V. Therefore, it is more useful to commonly connect this resistive heater and the electronic circuit to this power supply.

A material for forming the positive electrode 10C and the negative electrode 20C is will now be described. Such a material preferably contains at least two selected from the group consisting of gold, platinum, chromium, titanium, copper, aluminum, titanium nitride, and tantalum nitride. Other conductive elements or compounds other than these elements and compounds may be used.

For the resistive heater of the present invention, the resistivity of the positive electrode 10C and that of the negative electrode 20C are critical. Suppose that an imaginary resistive heater has the same configuration as that of the known resistive heater shown in FIGS. 7A and 7B and includes a positive electrode 110, a negative electrode 120, and a resistor 130 and a material for forming this positive electrode 110 and this negative electrode 120 has a resistivity equal to that of a material for forming this resistor 130.

In general, it is not rare that a positive electrode and a negative electrode have a length greater than or equal to that of this resistor 130. If this positive electrode 110 and this negative electrode 120 have a length equal to that of this resistor 130, this positive electrode 110 and this negative electrode 120 consume half of the electricity input to the imaginary resistive heater. That is, in order to allow this resistor 130 to generate 300 mW of heat, 600 mW of electricity must be input to the imaginary resistive heater.

Furthermore, suppose that another imaginary resistive heater has the same configuration as that of the resistive heater, shown in FIGS. 4A and 4B, according to the fourth example and includes a positive electrode 10C, a negative electrode 20C, and a resistor 30C. Since these positive and negative electrodes 10C and 20C have a length greater than that of those positive and negative electrodes included in the known resistive heater shown in FIGS. 7A and 7B, this resistor 30C has an apparent electrical resistance R' less than that of that resistor included in the known resistive heater; however, the sum of the electrical resistances of these positive and negative electrodes 10C and 20C is greater than the sum of the electrical resistances of those positive and negative electrodes of the known resistive heater. Therefore, there is a problem in that the amount of heat generated from this resistor 30C is greater than the sum of the amount of heat generated from this positive electrode 10C and that from this negative electrode 20C. Hence, these positive and negative electrodes 10C and 20C must have an electrical resistance sufficiently less than that of this resistor 30C.

In the positive and negative electrodes 10C and 20C, described in the fourth example, having the triple layer structure consisting of the Al layer 52, the Ti layer 53, and the Au layer 54, each section between the connection 11C (bonding pad) of the positive electrode 10C and the node P31, P33, or P35 thereof has an electrical resistance of about 1 to 3 Ω and each section between the connection 21C (bonding pad) of the negative electrode 20C and the node P32, P34, or P36 thereof has an electrical resistance of about 1 to 3 Ω. Since the number n of the effective regions of the resistor 30C is five (see FIGS. 4A and 4B), the positive and negative electrodes 10C and 20C are allowed to have an electrical resistance less than 4% of that of the resistor 30C. If the number n of the effective regions of the resistor 30C is eight, the positive and negative electrodes 10C and 20C are allowed to have an electrical resistance less than 10% of that of the resistor 30C.

FIFTH EXAMPLE

Figure 6:
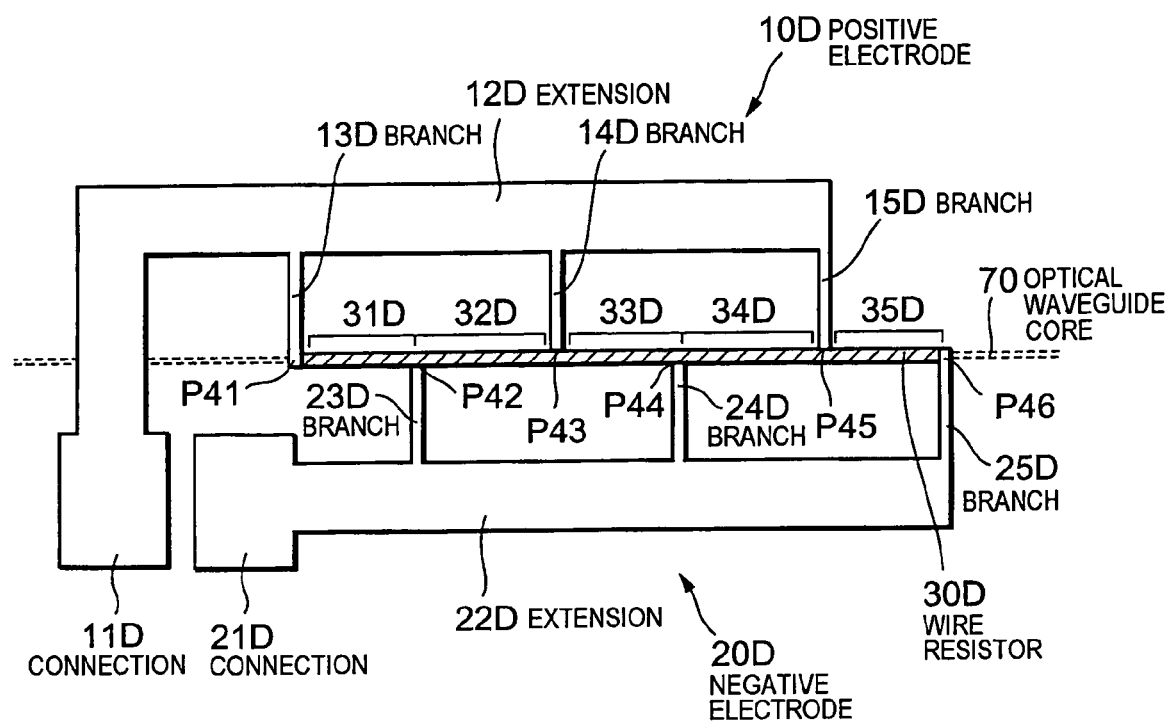
FIG. 6 is a plan view showing a configuration of a thermooptic phase shifter according to a fifth example of the present invention.

FIG. 6 is a plan view showing a configuration of a thermooptic phase shifter according to a fifth example of the present invention. The thermooptic phase shifter includes a resistive heater, which has substantially the same configuration as that of the resistive heater of the fourth example.

The thermooptic phase shifter further includes an insulating substrate (not shown) and a straight optical waveguide extending along the insulating substrate. The optical waveguide has a core 70, which is simply shown in FIG. 6. The core 70 is surrounded by a clad layer, which is not shown.

The resistive heater included in the thermooptic phase shifter includes a wire resistor 30D having a predetermined length; a positive electrode 10D, placed on a side (the upper side in FIG. 6) of the resistor 30D, extending along the resistor 30D; and a negative electrode 20D, placed on the side (the lower side in FIG. 6) opposite to the positive electrode 10D, extending along the resistor 30D.

The resistor 30D has the same configuration as that of the resistor 30C, shown in FIGS. 4A and 4B, according to the fourth example. The resistor 30D is placed above the clad layer surrounding the optical waveguide core 70 and extends in parallel to the optical waveguide core 70.

The positive electrode 10D includes a connection 11D, an L-shaped extension 12D, and three straight branches 13D, 14D, and 15D. The branch 13D is connected to a node P41 placed at one end of the resistor 30D. The branch 14D is connected to a node P43 placed on the resistor 30D. The branch 15D is connected to a node P45 placed on the resistor 30D.

The negative electrode 20D includes a connection 21D, a straight extension 22D, and three straight branches 23D, 24D, and 25D. The branch 23D is connected to a node P42 placed on the resistor 30D. The branch 24D is connected to a node P44 placed on the resistor 30D. The branch 25D is connected to a node P46 placed at the other end of the resistor 30D.

An effective region 31D is present between the nodes P1 and P42 of the resistor 30C, an effective region 32D is present between the nodes P42 and P43, an effective region 33D is present between the nodes P43 and P44, an effective region 34D is present between the nodes P44 and P45, and an effective region 35D is present between the nodes P45 and P46. The nodes P41 to P46 are arranged such that the five effective regions 31D, 32D, 33D, 34D, and 35D have the same length. Therefore, the effective regions 31D, 32D, 33D, 34D, and 35D have the same electrical resistance.

If the electrical resistances of the positive and negative electrodes 10C and 20C are negligible, an equivalent circuit of the resistor 30C is as shown in FIG. 4B, wherein R1, R2, R3, R4, and R5 (R1=R2=R3=R4=R5) represent the electrical resistance of the effective regions 31A, 32A, 33A, 34A, and 35A, respectively. The apparent electrical resistance R' of the resistive heater according to the fifth example of the present invention is equal to the electrical resistance of a circuit including five resistors, connected to each other in parallel, having an electrical resistance equal to R1, R2, R3, R4, or R5.

The thermooptic phase shifter according to the fifth example of the present invention can vary the phase of light propagated through the optical waveguide in such a manner that the resistor 30D is allowed to generate heat by applying a current to the resistive heater and the refractive index of the optical waveguide core 70 is varied by heating the optical waveguide core 70 using the heat.

In order to minimize the amount of electricity consumed by the resistor 30D, the optical waveguide core 70 must be efficiently heated. Since the heat generated from the resistor 30D is transmitted to the optical waveguide core 70 through the clad layer made of glass, the distance between the optical waveguide core 70 and the resistor 30D for generating heat is preferably small as long as optical properties of the core 70 are not deteriorated. In this example, the resistor 30D is placed close to the optical waveguide core 70 and extends in parallel to the optical waveguide core 70; hence, the distance therebetween is minimum and the heat generated from the resistor 30D can therefore be efficiently transmitted to the core 70. Furthermore, the temperature of a section, extending in the direction that light travels, for heating the core 70 is uniform; hence, optical properties of the core 70 can be prevented from being deteriorated due to thermal stress.

[Modification]

The first to fifth examples described above are intended to illustrate the present invention. Therefore, the present invention is not limited these examples and various modifications may be made within the scope of the present invention. For example, the number, position, and shape of connections, extensions, and branches of positive and negative electrodes may be arbitrarily varied as required.

As described above in detail, according to the present invention, although a resistor is made of a material, such as tantalum nitride or titanium nitride, having a relatively large resistivity, the apparent electrical resistance (the superficial electrical resistance of the resistive heater) is less than the electrical resistance estimated from the material. Therefore, the amount of heat generated from the resistive heater can be controlled with a simple electronic circuit. The apparent electrical resistance of the resistive heater can be adjusted to any value. Accordingly, the present invention is exceedingly useful in manufacturing a wire-shaped resistive heater controllable with a simple electronic circuit.

The invention claimed is:

1. A resistive heater comprising:
   a wire resistor;
   a first electrode, placed on a side of the resistor, extending along the resistor; and
   a second electrode, placed on the side opposite to the first electrode, extending along the resistor;
   wherein the first electrode is connected to a plurality of first nodes placed on the resistor with branches spaced along the resistor;
   the second electrode is connected to a plurality of second nodes placed on the resistor with branches spaced along the resistor;
   the second nodes are spaced from the first nodes in the longitudinal direction of the resistor, and the resistor has effective regions each sandwiched between one of the first nodes and one of the second nodes that is adjacent to the first connection.

2. The resistive heater according to claim 1, wherein the first and second nodes are alternatively arranged in the longitudinal direction of the resistor.

3. The resistive heater according to claim 1 or 2, wherein one of the first nodes and one of the second nodes are each placed at one of both ends of the resistor.

4. The resistive heater according to claim 1 or 2, wherein the resistor is made of a material principally containing titanium nitride or tantalum nitride.

5. The resistive heater according to claim 1 or 2, wherein the first and second electrodes are made of a material containing at least two selected from the group consisting of gold, platinum, chromium, titanium, copper, aluminum, titanium nitride, and tantalum nitride.

6. A resistive heater comprising:
   a wire resistor;
   a first electrode, placed on a side of the resistor, extending along the resistor; and a second electrode, placed on the side opposite to the first electrode, extending along the resistor,
   wherein the first electrode is connected to a plurality of first nodes placed on the resistor with branches spaced along the resistor,
   the second electrode is connected to a plurality of second nodes placed on the resistor with branches spaced along the resistor,
   the second nodes are spaced from the first nodes in the longitudinal direction of the resistor, and the resistor has effective regions each sandwiched between one of the first nodes and one of the second nodes that is adjacent to the first connection, wherein the first and second nodes are arranged such that the effective regions extend in the longitudinal direction of the resistor and have the same length.

7. The resistive heater according to claim 1, wherein said first positive electrode and said second electrodes each include a conductive body having a resistivity sufficiently less than that of the resistor.

8. The resistive heater according to claim 7, wherein said conductive body has a triple layer structure consisting of an aluminum (Al) layer, a titanium (Ti) layer, and a gold (Au) layer.

9. The resistive heater according to claim 1, wherein said first electrode and said second electrode are parallel to the resistor.

10. The resistive heater according to claim 1, wherein said first electrode and said second electrode each include a connection, an extension, and number of branches.

11. The resistive heater according to claim 10, wherein said effective regions of the resistor can be varied by changing the number and/or position of the branches of the positive or negative electrode.

12. The resistive heater according to claim 11, wherein by changing the number and/or position of the branches, the apparent electrical resistance of the resistive heater can be adjusted to any value.

13. The resistive heater according to claim 1, which are used for heating an optical waveguide;

wherein the resistor is placed along the optical waveguide.

14. The resistive heater according to claim 13, wherein the resistor extends in parallel to the optical waveguide.

* * * * *